United States Patent
Jivanjee, Jr.

(12) 
(10) Patent No.: US 9,010,662 B1
(45) Date of Patent: Apr. 21, 2015

(54) LAWN AND TREE FERTILIZING DEVICE INSTALLABLE ON SPRINKLER SYSTEM

(71) Applicant: Mehboob H. Jivanjee, Jr., Miami, FL (US)

(72) Inventor: Mehboob H. Jivanjee, Jr., Miami, FL (US)

(*) Notice: Subject to any disclaimer, the term of this patent is extended or adjusted under 35 U.S.C. 154(b) by 288 days.

(21) Appl. No.: 13/690,301

(22) Filed: Nov. 30, 2012

Related U.S. Application Data

(63) Continuation-in-part of application No. 12/701,072, filed on Feb. 5, 2010, now Pat. No. 8,342,427.

(51) Int. Cl.
*A62C 5/02* (2006.01)
*A01C 23/00* (2006.01)

(52) U.S. Cl.
CPC .................................. *A01C 23/007* (2013.01)

(58) Field of Classification Search
CPC ..... A01G 25/00; A01C 23/027; A01C 23/042
USPC .................. 239/310, 315, 316, 569, 379, 302
See application file for complete search history.

(56) References Cited

U.S. PATENT DOCUMENTS

| | | |
|---|---|---|
| 3,833,177 A | 9/1974 | Pasley et al. |
| 4,750,512 A | 6/1988 | Craig |
| 4,898,202 A | 2/1990 | Craig |
| 4,908,190 A | 3/1990 | Maglio et al. |
| D325,328 S | 4/1992 | Smiley |
| 5,364,030 A | 11/1994 | Murdock et al. |
| 5,730,364 A | 3/1998 | Gertie |
| 2002/0145057 A1 | 10/2002 | Leedy et al. |
| 2006/0202057 A1 | 9/2006 | Taggart et al. |

OTHER PUBLICATIONS www.ridsystem.com; Retrofit Irrigation Distribution System; Internet as of Feb. 5, 2010.

*Primary Examiner* — Davis Hwu

(57) ABSTRACT

The present invention features a fertilizing device for installing in a water system comprising a top cover removably and sealably attached to a base; an intake pipe disposed on a first side and an outlet pipe disposed on a second side of the base, the intake pipe and outlet pipe are both fluidly connected to the inner cavity of the top cover; an open container with apertures disposed in the first and second container side walls for holding a fertilizer bar; wherein the intake pipe is connected to a first portion of a pipe of the water system, the outlet pipe is connected to a second portion of the pipe of the water system; wherein water from the water system can enter the intake pipe, mix with the fertilizer bar, and exit via the outlet pipe.

10 Claims, 6 Drawing Sheets

LAWN AND TREE FERTILIZING DEVICE INSTALLABLE ON SPRINKLER SYSTEM

CROSS REFERENCE

This application claims priority to U.S. Non-Provisional application Ser. No. 12/701,072 filed Feb. 5, 2010 as a continuation-in-part, the disclosure of which is incorporated herein by reference in its entirety.

FIELD OF THE INVENTION

The present invention is related to a fertilizing device for fertilizing landscaping such as trees or lawns, or for dispersing insect repellant. More particularly, the present invention is related to a fertilizing device that can be installed on an existing sprinkler system.

BACKGROUND OF THE INVENTION

Fertilizing a lawn or other area with vegetation can be time consuming. The present invention features a device that can easily be installed on an existing water system (e.g., water pump, sprinkler, etc.) that can allow for the simultaneous watering and fertilizing of a lawn (or other area).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a fertilizing device for installing in a water system comprising a top cover removably and sealably attached to a base; an intake pipe disposed on a first side and an outlet pipe disposed on a second side of the base, the intake pipe and outlet pipe are both fluidly connected to the inner cavity of the top cover; an open container with apertures disposed in the first and second container side walls for holding a fertilizer bar with fertilizer; wherein the intake pipe is connected to a first portion of a pipe of the water system, the outlet pipe is connected to a second portion of the pipe of the water system; wherein water from the water system can enter the intake pipe, mix with the chemical bar, and exit via the outlet pipe.

DESCRIPTION OF PREFERRED EMBODIMENTS

Figure 1:
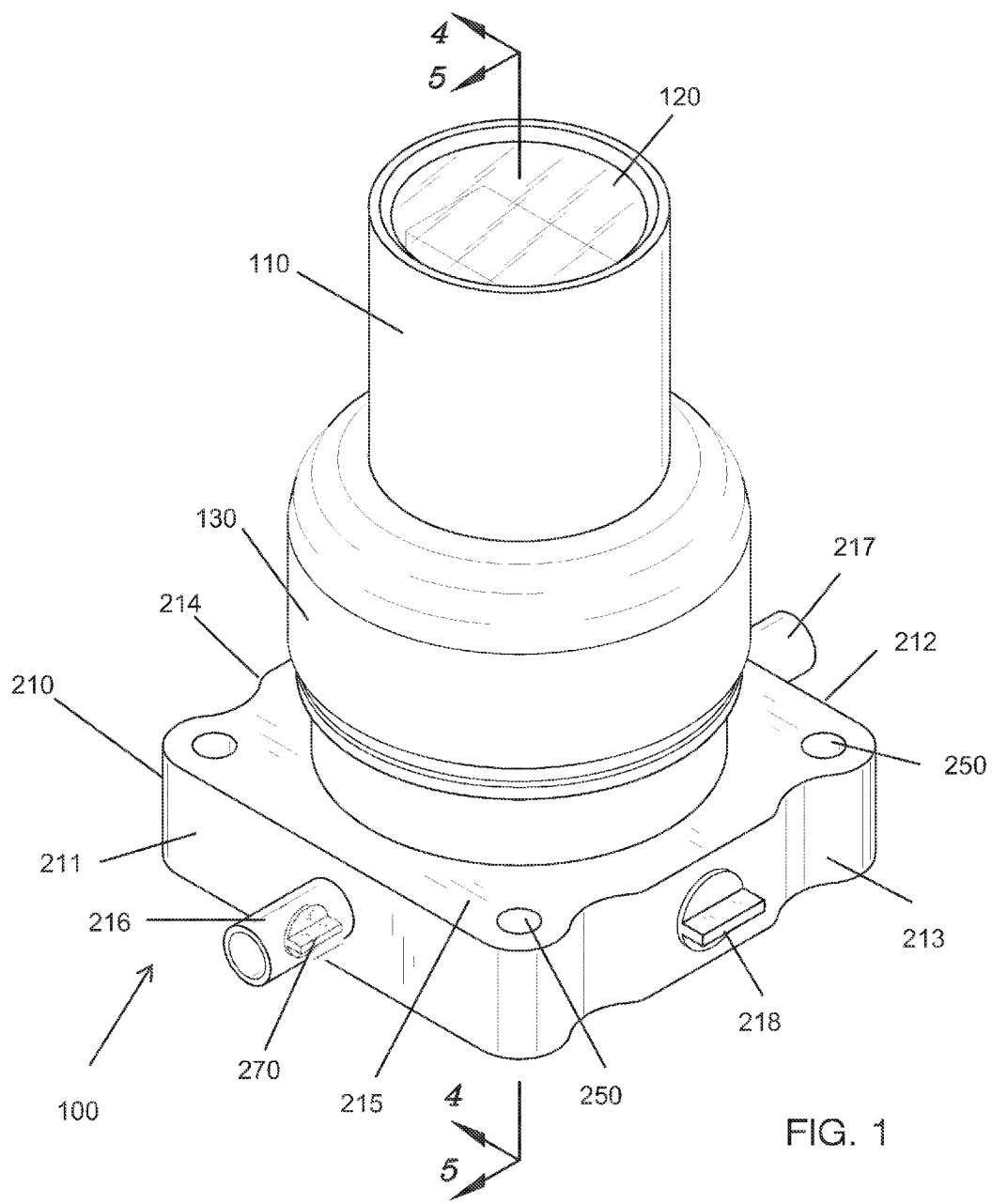
FIG. 1 shows an isometric view from the top cover of the fertilizing device.
Figure 2:
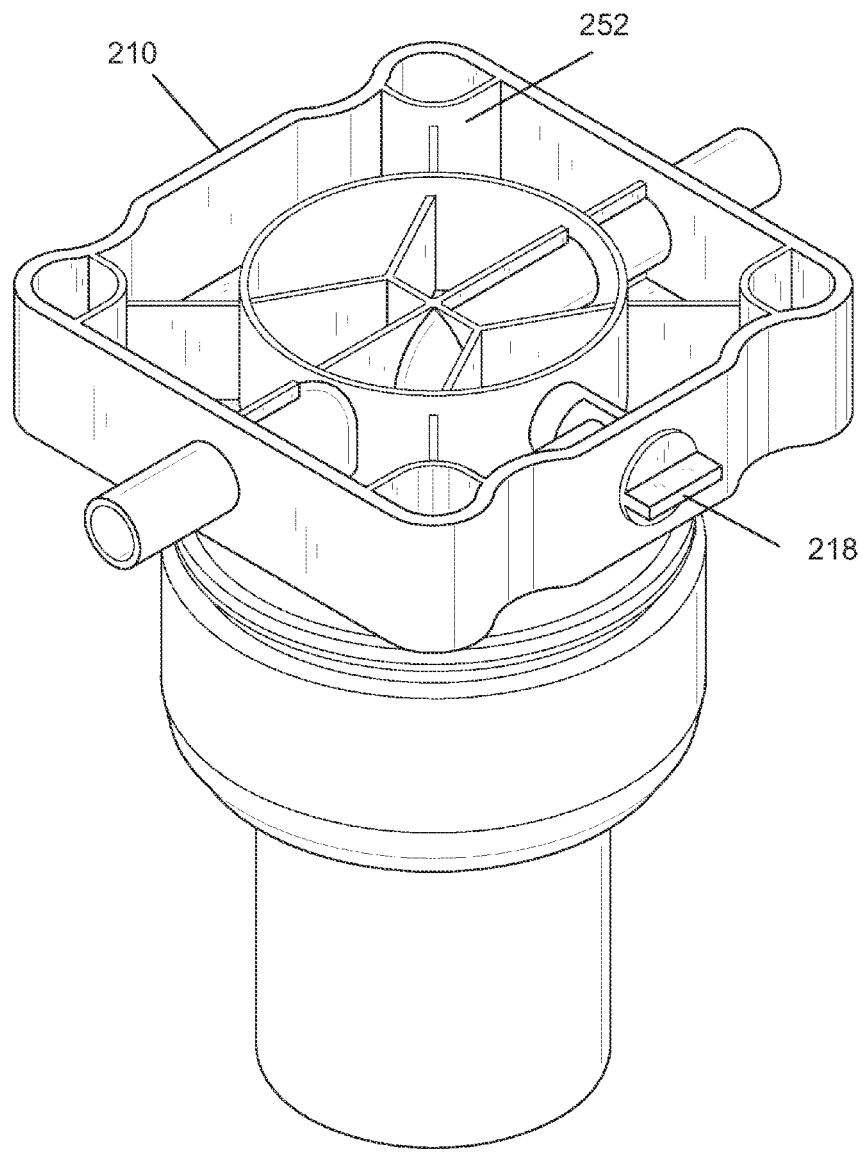
FIG. 2 shows an isometric view from the base of the fertilizing device.
Figure 3:
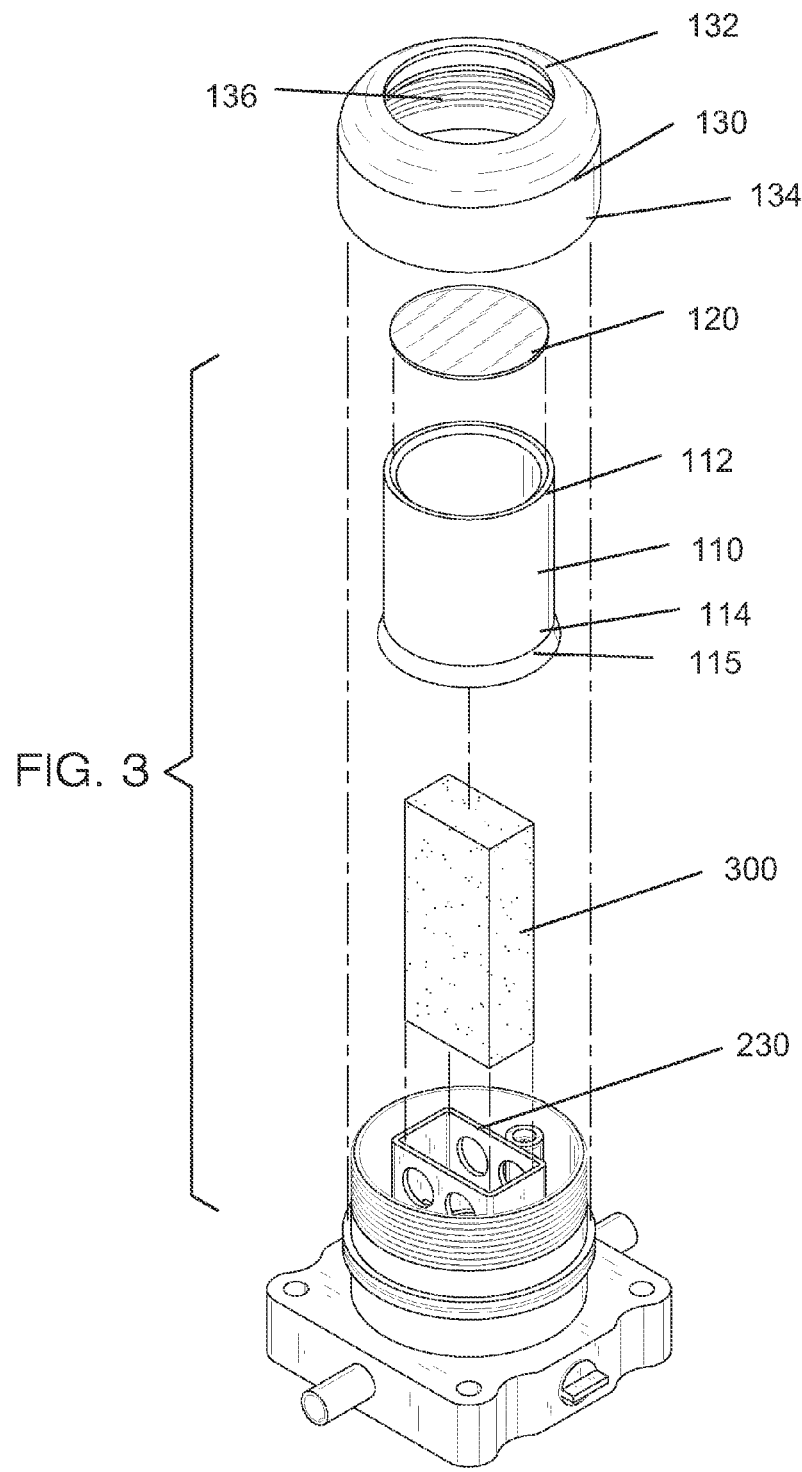
FIG. 3 shows an exploded view of the fertilizing device.
Figure 4:
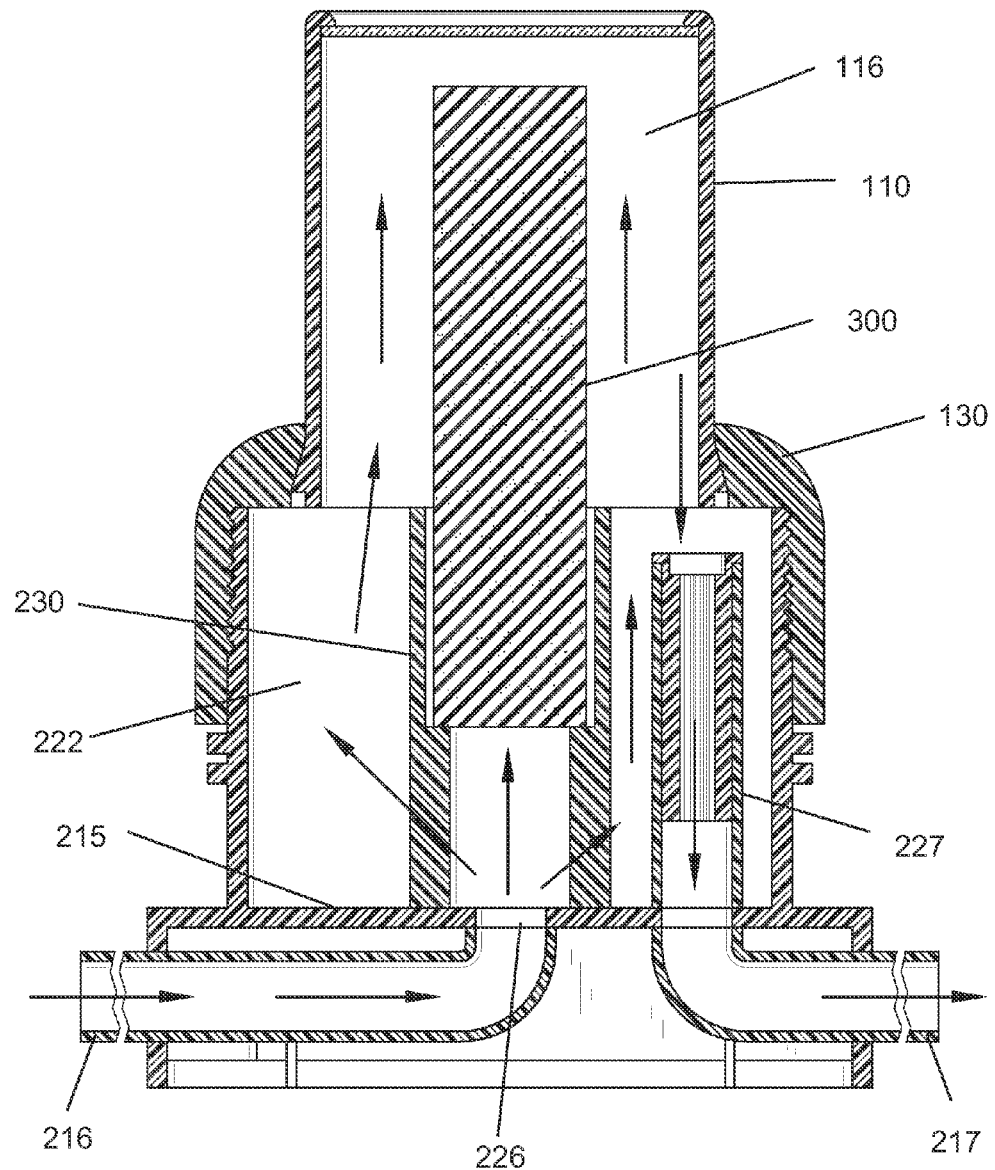
FIG. 4 shows a cross-section view of the fertilizing device.
Figure 5:
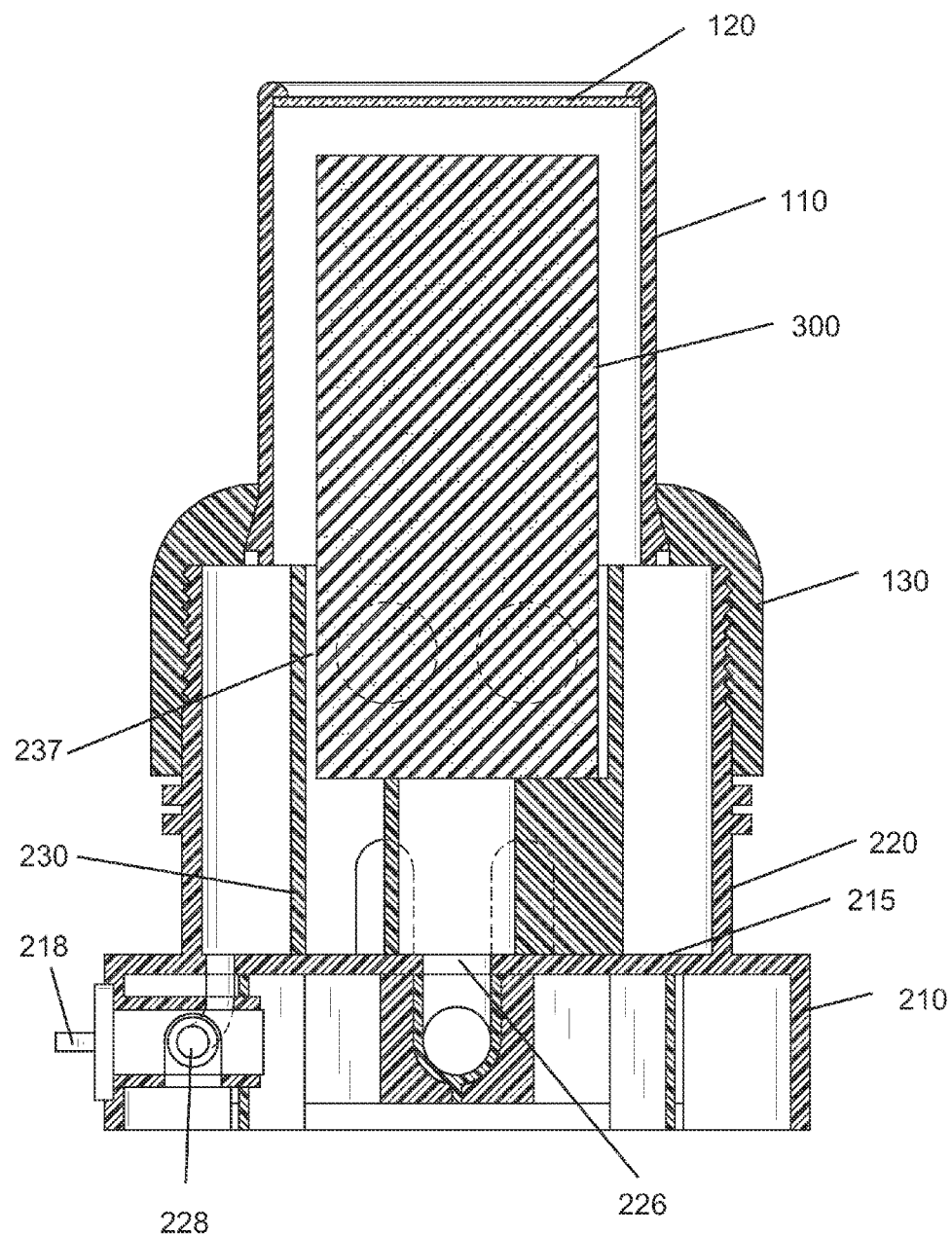
FIG. 5 shows an alternative cross-section view of the fertilizing device.
Figure 6:
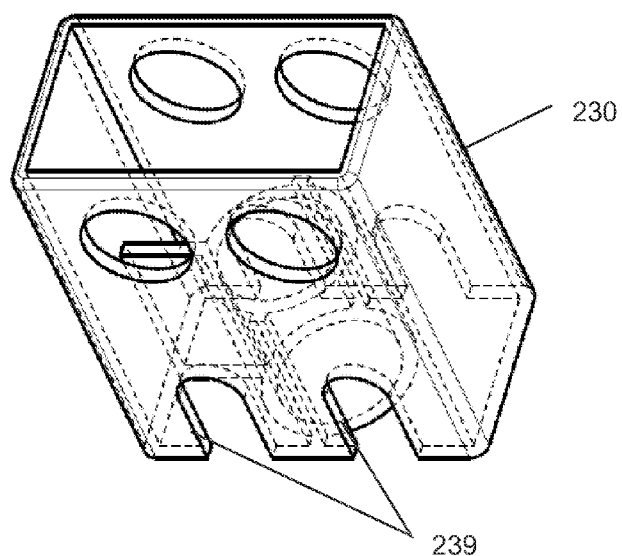
FIG. 6 shows an isometric view of the bar holder.
Figure 7:
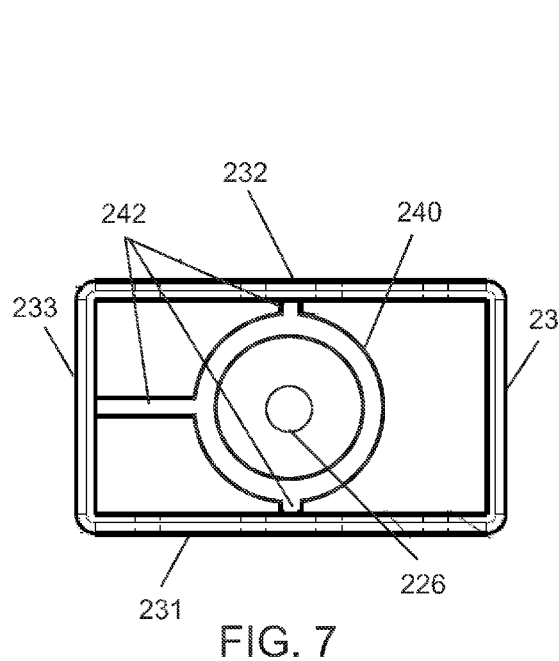
FIG. 7 shows a top view of the bar holder.
Figure 8:
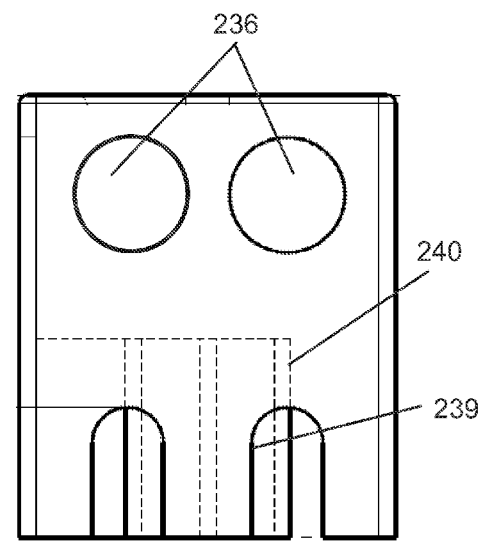
FIG. 8 shows a side view of the bar holder.

Following is a list of elements corresponding to a particular element referred to herein:

100 lawn fertilizing device
110 top cover
112 top cover upper end
114 top cover lower end
115 lower end rim
116 top cover inner cavity
120 lens
130 screw cap
132 screw cap top opening
134 screw cap lower opening
136 screw cap inner thread
210 base
211 base first side
212 base second side
213 base third side
214 base fourth side
215 base top side
216 water inlet pipe
217 water outlet pipe
218 water drain control knob
220 threaded cylindrical wall
222 base inner cavity
226 water inlet aperture
227 water outlet connection pipe
228 drain valve
230 bar holder
231 bar holder first side wall
232 bar holder second side wall
233 bar holder third side wall
234 bar holder fourth side wall
235 bar holder interior space
236 open hole
237 space gap between the bar holder and the fertilizer bar
238 drain hole
239 lower slot on bar holder side walls
240 bar support pipe
242 reinforcement wall
250 base installation hole
252 installation hole side wall
260 water inlet valve
300 fertilizer bar Referring now to FIG. 1-8, the present invention features a lawn fertilizing device (100) for installing in a water system. The device comprises a cylindrical top cover (110), a screw cap (130), a square prism base (210), a bar holder (230) and a fertilizer bar (300).

The tubular top cover (110) has an upper end (112) and a lower end (114), wherein a transparent lens (120) is disposed on the upper end; wherein a lower end rim (115) is disposed on the lower end (114), wherein the top cover (110) has a cover cavity (116). In some embodiments, the tubular top cover (110) has a cylindrical shape. In some embodiments, the lens is made of glass, transparent plastics, such as polyester, polyethylene, or other similar materials. The transparent lens (120) provides a means to visually check the inside situation within the top cove, including the lifespan of the fertilizer, without opening the top cover.

The screw cap (130) has a top opening (132) and a lower opening (134) and an inner thread (136) disposed within the screw cap adjacent to the lower opening (134), wherein the tubular top cover (110) slidably passed through the top opening (132) from the upper end direction until the lower end rim (115).

The base (210) has a first side (211), a second side (212) opposite to the first side (211), a third side (213), a fourth side (214), a top side (215) and a bottom opening (219), wherein a water inlet is disposed on the first side (211) and a water outlet pipe is disposed on the second side (212), wherein a water drain control knob (218) is disposed on the third side (213), wherein a threaded cylindrical wall (220) is disposed on the top side (215) of the base to form a base inner cavity (222), wherein the threaded cylindrical wall (220) is configured to engage the inner thread (136) of the screw cap (136) such that the tubular top cover (110) is removably and water-tightly attached to the base, wherein the base inner cavity (222) is fluidly connected to the top cover inner cavity (116) after the top cover is attached to the base, wherein a water inlet aperture (226) is disposed on the center of the top side (215) and within the threaded cylindrical wall (220); wherein the water inlet aperture (226) is fluidly connected to the water inlet pipe; wherein a water outlet connection pipe (227) is disposed on the top side (215) of the base and within the threaded cylindrical wall (220), wherein the water outlet connection pipe (227) is fluidly connected to the water outlet pipe (217).

The bar holder (230) is disposed on the top side (215) within threaded cylindrical wall (220), wherein the bar holder (230) is a rectangle chamber comprising a first side wall (231), a second side wall (232), a third side wall (233) and a fourth side wall (234), wherein the four side walls form a bar holder interior space (235). In some embodiments, the four side walls are all has a height the same as the threaded cylindrical wall (220).

A hollow bar support pipe (240) is disposed within the bar holder (230) and encloses the water inlet aperture (226), wherein the bar support pipe (240) is shorted in height than the side walls of the bar holder (230). In some embodiments, at least one open hole (236) is disposed on the first side wall (231) and the second side wall (232), wherein the open holes are disposed above the bar support pipe (240).

In some embodiments, a plurality of reinforcement walls (242) are disposed within the bar holder (230) to attach the bar support pipe (240) to the side walls of the bar holder (230), wherein the reinforcement walls (242) align to the bar support pipe (240) in height.

The fertilizer bar (300) is configured to loosely fit within the bar holder interior space (235) with a space gap (237) between the bar holder and the fertilizer bar, wherein the fertilizer bar (300) is supported by the bar support pipe (240).

In some embodiments, at least one lower slot (239) is disposed on the first side wall (231) and the second side wall (232), wherein the lower slots (239) are disposed below the bar support pipe (240). The lower slots (239) are such configured such that water may also escape from those slots after entering into the base inner cavity (222) and therefore the water in-rush pressure on the fertilizer bar is be controlled to be within an acceptable range to prevent the fertilizer bar being pushed up and hit the lens (120) under in-rush water inlet flow.

Water can enter the base (210) consequently through the water inlet pipe (216), the water inlet aperture (226) and the bar support pipe (240), then mix with the fertilizer bar (300), subsequently enter the water outlet connection pipe (227) and finally exit the base (210) via the water outlet pipe (217). In some embodiments, water may flow though the holes (236) on the bar holder (230) or through the open gap (237) between the fertilizer bar (300) and the side walls of the bar holder (230), In some embodiments, the device further comprises a drain hole (238) disposed on the on the top side (215) of the base and within the threaded cylindrical wall (220), wherein the drain hole (238) is fluidly connected to a drain valve (228) attached to the base (210) below the drain hole (238), wherein the drain valve (228) is configured to open or block water drainage within the base inner cavity (222) and the top cover inner cavity (116), wherein the drain valve (228) is controlled by a drain control knob (218) disposed on the third side wall (213) of the base (210). The drain hole (238) and drain valve (228) are such configured such that the residue water may be released to prevent the residue water being frozen within the base inner cavity (222) during cold weather.

In some embodiments, the base (210) further comprise four installation holes (250) disposed adjacent to each corner of the base (210), wherein each installation hole (250) is a through hole enclosed by the base side wall and an installation hole side wall (252), wherein the installation hole side wall (252) aligns to the side walls of the base (210) in height. The base can be secured to ground or other support frames using 4 nails or screw bolts passing through the installation holes.

In some embodiments, the water outlet connection pipe (227) is disposed on the top side (215) of the base with water flow direction perpendicular to the top side (215), wherein the water outlet connection pipe (227) is lower than the side walls of the bar holder (230) but higher than the bar support pipe (240). The water outlet connection pipe (227) is such configured that incoming water has to submerge a part of the fertilizer bar before the water can flow out from the water outlet connection pipe.

In some embodiments, the device further comprises a water inlet valve (260) disposed within the water inlet pipe (216), wherein the water inlet valve can move between an open position and a closed position for respectively allowing and preventing the inlet flow of water. The water inlet valve can be controlled electronically or manually. In some embodiments, the water inlet valve (260) is controlled manually by a water inlet valve control knob (270) on the water inlet pipe (216).

In some embodiments, the base is made of plastics, such as ABS, polypropylene, high density polyethylene (HDPE), etc.

The following the disclosures of the following U.S. Patents are incorporated in their entirety by reference herein: U.S. Pat. Application No. 2002/0145057; U.S. Pat. Application No. 2006/0202057; U.S. Pat. No. 5,730,364; U.S. Pat. No. 3,833,177; U.S. Pat. No. 5,364,030.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A lawn fertilizing device (100) for installing in a water system, said lawn fertilizing device comprising:
    (a) a tubular top cover (110) with an upper end (112) and a lower end (114), wherein a transparent upper screen (120) is disposed on the upper end; wherein a lower end rim (115) is disposed on the lower end (114), wherein the top cover (110) has a cover cavity (116);
    (b) a screw cap (130) with a top opening (132) and a lower opening (134) and an inner thread (136) disposed within the screw cap, wherein the tubular top cover (110) slidably passes through the top opening (132) from the upper end direction to terminate at the lower end rim (115);

(c) a base (210) with a first side (211), a second side (212) opposite to the first side (211), a third side (213), a fourth side (214) and a top side (215), wherein a water inlet is disposed on the first side (211) and a water outlet pipe is disposed on the second side (212), wherein a threaded cylindrical wall (220) is disposed on the top side (215) of the base to form a base inner cavity (222), wherein the threaded cylindrical wall (220) is configured to engage the inner thread (136) of the screw cap (136) such that the tubular top cover (110) is removably and water-tightly attached to the base, wherein the base inner cavity (222) is fluidly connected to the top cover inner cavity (116) after the top cover is attached to the base, wherein a water inlet aperture (226) is disposed on the center of the top side (215) and within the threaded cylindrical wall (220); wherein the water inlet aperture (226) is fluidly connected to the water inlet pipe; wherein a water outlet connection pipe (227) is disposed on the top side (215) of the base and within the threaded cylindrical wall (220), wherein the water outlet connection pipe (227) is fluidly connected to the water outlet pipe (217);

(d) a bar holder (230) disposed on the top side (215) within threaded cylindrical wall (220), wherein the bar holder (230) is a rectangle chamber comprising a first side wall (231), a second side wall (232), a third side wall (233) and a fourth side wall (234), wherein the four side walls form a bar holder interior space (235), wherein a hollow bar support pipe (240) is disposed within the bar holder (230) and encloses the water inlet aperture (226), wherein the bar support pipe (240) is lower than the side walls of the bar holder (230);

(e) a fertilizer bar (300) configured to fit within the bar holder interior space (235) with a space gap (237) between the bar holder and the fertilizer bar, wherein the fertilizer bar (300) is supported by the bar support pipe (240); and wherein water can enter the base (210) consequently through the water inlet pipe (216), the water inlet aperture (226) and the bar support pipe (240), then mix with the fertilizer bar (300), subsequently enter the water outlet connection pipe (227) and finally exit the base (210) via the water outlet pipe (217).

2. The lawn fertilizing device (100) of claim 1, wherein the tubular top cover (110) is has a cylindrical shape.

3. The lawn fertilizing device (100) of claim 1, wherein all of the four side walls of the bar holder (230) have a height the same as the threaded cylindrical wall (220).

4. The lawn fertilizing device (100) of claim 1, wherein at least one open hole (236) is disposed on the first side wall (231) and the second side wall (232) of the bar holder (230), wherein the open holes are disposed above the bar support pipe (240).

5. The lawn fertilizing device (100) of claim 1, wherein the device further comprises a water drain control knob (218) and a drain hole (238), wherein the water drain control knob (218) is disposed on the third side (213), wherein the drain hole (238) is disposed on the on the top side (215) of the base and within the threaded cylindrical wall (220), wherein the drain hole (238) is fluidly connected to a drain valve (228) attached to the base (210) below the drain hole (238), wherein the drain valve (228) is configured to open or block water drainage within the base inner cavity (222) and the top cover inner cavity (116), wherein the drain valve (228) is controlled by the drain control knob (218).

6. The lawn fertilizing device (100) of claim 1, wherein at least one lower slot (239) is disposed on the first side wall (231) and the second side wall (232), wherein the lower slots (239) are disposed below the bar support pipe (240).

7. The lawn fertilizing device (100) of claim 1, wherein a plurality of reinforcement walls (242) are disposed within the bar holder (230) to attach the bar support pipe (240) to the side walls of the bar holder (230), wherein the reinforcement walls (242) align to the bar support pipe (240) in height.

8. The lawn fertilizing device (100) of claim 1, wherein the base (210) further comprise four installation holes (250) disposed adjacent to each corner of the base (210), wherein each installation hole (250) is a through hole enclosed by the base side wall and an installation hole side wall (252), wherein the installation hole side wall (252) aligns to the side walls of the base (210) in height.

9. The lawn fertilizing device (100) of claim 1, wherein the water outlet connection pipe (227) is disposed on the top side (215) of the base with water flow direction perpendicular to the top side (215), wherein the water outlet connection pipe (227) is lower than the side walls of the bar holder (230) but higher than the bar support pipe (240).

10. The lawn fertilizing device (100) of claim 1, wherein the device further comprises a water inlet valve (260) disposed on the water inlet pipe (216), wherein the valve can move between an open position and a closed position for respectively allowing and preventing the inlet flow of water.

* * * * *